(12) United States Patent
Choi

(10) Patent No.: US 6,417,820 B1
(45) Date of Patent: Jul. 9, 2002

(54) HEAD MOUNTED DISPLAY AND OPTICAL SYSTEM FOR USE IN HMD

(75) Inventor: Soon-cheol Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/570,014

(22) Filed: May 12, 2000

(51) Int. Cl.⁷ .................................................. G09G 5/00
(52) U.S. Cl. ..................... 345/8; 345/7; 345/9; 359/13; 359/630; 359/632
(58) Field of Search ....................... 345/7, 8, 9; 359/13, 359/630, 632

(56) References Cited

U.S. PATENT DOCUMENTS

| | | | | |
|---|---|---|---|---|
| 5,864,326 A | * | 1/1999 | Rallison | 345/7 |
| 5,933,279 A | * | 8/1999 | Yamazaki | 345/7 |
| 6,023,253 A | * | 2/2000 | Taniguchi et al. | 345/7 |
| 6,097,353 A | * | 8/2000 | Melville et al. | 345/7 |
| 6,246,383 B1 | * | 6/2001 | Ophey | 345/8 |

FOREIGN PATENT DOCUMENTS

| | | | |
|---|---|---|---|
| JP | 3-113483 | 5/1991 | G09F/9/00 |
| JP | 7-13123 | 1/1995 | G02F/1/13 |
| JP | 7-287188 | 10/1995 | G02B/27/02 |

* cited by examiner

*Primary Examiner*—Bipin Shalwala
*Assistant Examiner*—Vincent E. Kovalick
(74) *Attorney, Agent, or Firm*—Sughrue Mion, PLLC

(57) ABSTRACT

A head mounted display device which generates an image using a single image generating unit of a small display device and is capable of simulating a large screen, and an optical system for use in the HMD are provided. The head mounted display device includes a light source for generating and irradiating light, an image generator for generating an image from light irradiated from the light source, an image forming lens unit for primarily forming the image generated by the image generator, a first light branching portion for transmitting and reflecting the image generated by the image generator and branching the image, a first light path converter for converting the traveling path of the image reflected from the first light branching portion, a first reflecting mirror on which the image received from the first light path converter is reflected toward an eye of a user, a second light branching portion, disposed on the light path between the first light path converter and the first reflecting mirror, for changing the traveling path of the incident image, a second light path converter for converting the traveling path of the image having passed through the first light branching portion, a second reflecting mirror on which the image received from the second light path converter is reflected toward the other eye of a user, and a third light branching portion, disposed along the light path between the second light path converter and the second reflecting mirror, for changing the traveling path of the incident image.

22 Claims, 7 Drawing Sheets

HEAD MOUNTED DISPLAY AND OPTICAL SYSTEM FOR USE IN HMD

BACKGROUND OF THE INVENTION

1. Field of the Invention

The present invention relates to a head mounted display (HMD) which is capable of implementing a high-magnification image using a secondary image forming system and which uses a single display unit, and an optical system for use in the HMD, which can allow an image provided by a small-sized display device of 0.7 inch or less to be viewed in an enlarged scale of angular magnification of substantially 10 times.

2. Description of the Related Art

In general, a head mounted display (referred to as HMD hereinafter) forms an image using a display device such as a liquid crystal display device (LCD) and enlarges the formed image using a mirror to be viewed in an enlarged scale. The HMD is used in the state where it is mounted on the head of a viewer.

Referring to FIG. 1, a conventional HMD includes a back light source 11, an image generating means 15 for generating an image by selectively transmitting light irradiated from the back light source 11, a spherical reflecting mirror 19, and a half mirror 17 for reflecting the light having passed through the image generating means 15 toward the spherical reflecting mirror 19 and transmitting the light reflected from the spherical reflecting mirror 19 to a viewer's eye 24.

The HMD having the aforementioned configuration is installed in a housing 20 constructed to be mounted on the head of a viewer. The light reflected from the spherical reflecting mirror 19 and having passed through the half mirror 17 is directed to the viewer's eye 24 through a window 22.

The back light source 11 includes a lamp 12 which is a luminous body such as a fluorescent lamp, and a mirror 13 installed on one surface of the lamp 12 to make the light irradiated from the lamp 12 travel in one direction. The image generating means 15 includes a transmission type LCD 16 having two-dimensional pixels and which is independently driven in units of each pixel, and a pair of polarizers 17a and 17b installed in the front and rear of the LCD 16. The conventional HMD includes a pair of optical systems having the configuration shown in FIG. 1 to be used for viewer's left and right eyes, respectively.

The magnification of the HMD, that is, angular magnification, is determined by curvature of radius of the spherical reflecting mirror 19. Here, the angular magnification is defined by Expression (1) represented by a focal length f' of the spherical reflecting mirror 19 and a distance of distinct vision (which equal 250 mm) to indicate the enlargement capability of an HMD.

$$\text{Angular magnification} = \frac{\text{Distance of distinct vision}}{f'} \quad (1)$$

As described above, according to the conventional HMD, it is quite difficult to achieve angular magnification of over 10 times. In order to increase the angular magnification, since the curvature of radius of the spherical reflecting mirror 19 must be made small, the focal length of the spherical reflecting mirror is reduced. Thus, the LCD 16 must be disposed close to the half mirror 17. However, if the LCD 16 is close to the half mirror 17, the optical path may be shielded. Thus, it is difficult to attain high magnification of over 10 times. Also, since a pair of LCDs are used, the cost is high.

SUMMARY OF THE INVENTION

To solve the above problems, it is an objective of the present invention to provide a head mounted display (HMD) which generates an image using a single image generating unit of a small display device and is capable of implementing a large screen, and an optical system for use in the HMD.

Accordingly, to achieve the above objective, there is provided a head mounted display device including: a light source for generating and irradiating light, image generating means for generating an image from light irradiated from the light source, an image forming lens unit for primarily forming the image generated by the image generating means, first light branching means for transmitting and reflecting the image generated by the image generating means and branching the image, first light path converting means for converting the traveling path of the image reflected from the first light branching means, a first reflecting mirror on which the image is received from the first light path converting means is reflected toward an eye of a user, second light branching means disposed on the light path between the first light path converting means and the first reflecting mirror, for changing the traveling path of the incident image, second light path converting means for converting the traveling path of the image having passed through the first light branching means, a second reflecting mirror on which the image received from the second light path converting means is reflected toward the other eye of a user, and third light branching means disposed along the light path between the second light path converting means and the second reflecting mirror, for changing the traveling path of the incident image.

According to another aspect of the present invention, there is provided an optical system for a head mounted display device for forming an image which is generated by a display device, by enlarging the image using light irradiated from a light source. The optical system includes an image forming lens unit, for focusing the image generated by the display device, having at least one lens made of a material having a high refractive index and a high dispersion in order to have a strongly negative power, and at least one lens made of a material having a low refractive index and a low dispersion in order to have a strongly positive power. The optical system further includes a field lens, having a positive power, for forming the focused image on a primary image forming plane, a semi-transmissive mirror for transmitting or reflecting incident light to change the traveling path of the incident light, and a reflecting mirror, on which the incident light branched from the semi-transmissive mirror lands, for reflecting the light toward an eye of a user to allow the light to be directed toward the pupil of the user.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
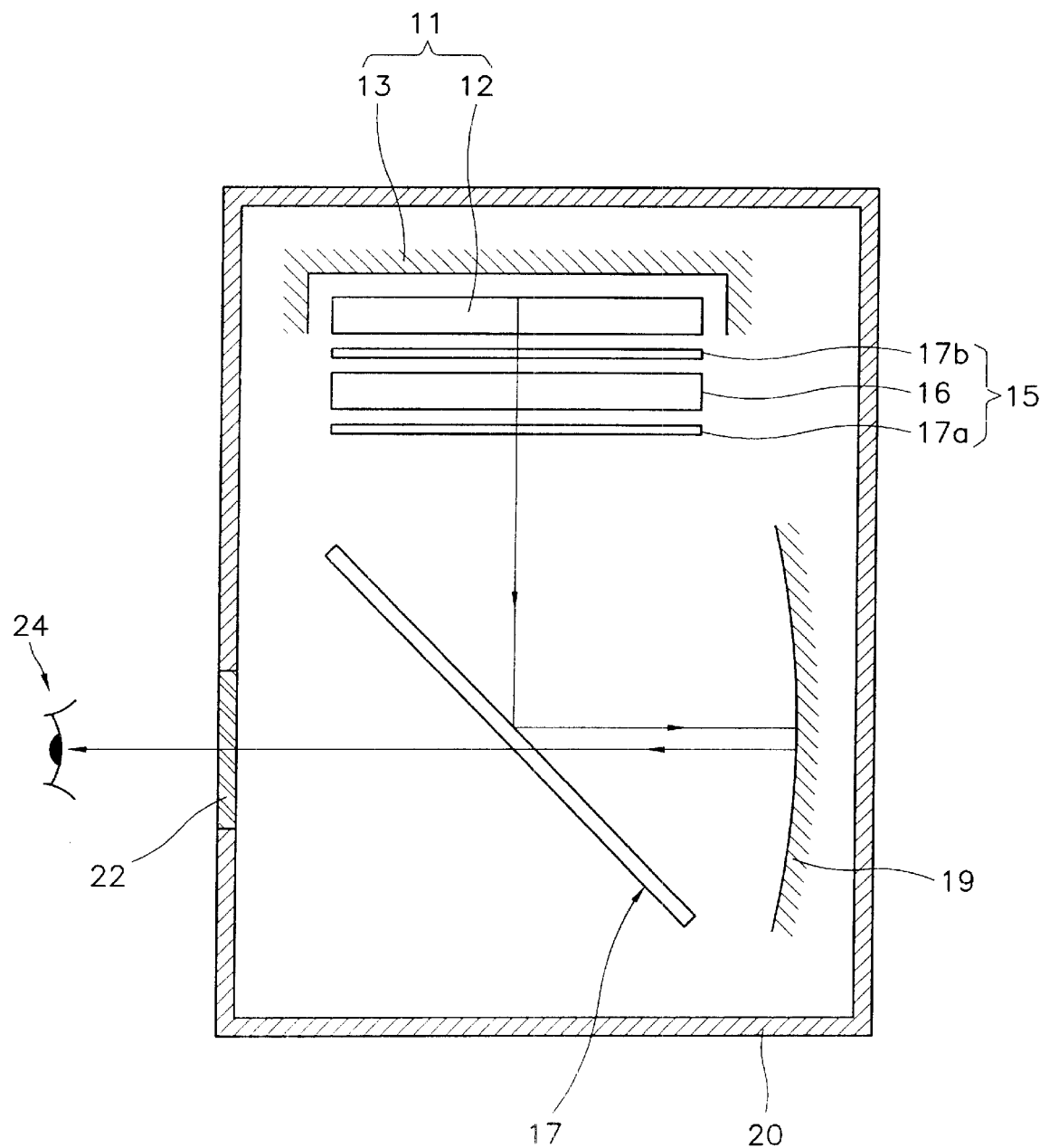
FIG. 1 is a schematic diagram illustrating the optical arrangement of a conventional head mounted display device (HMD)

Referring to FIGS. 2 through 5, a head mounted display device (HMD) according to an embodiment of the present invention includes a light source 30, an image generator 40 for generating an image from light irradiated from the light source 30, an image forming lens unit 50 for primarily forming the image generated by the image generator 40, first through third light branching portions 61, 63 and 65 for transmitting and reflecting an incident image and branching the incident image, first and second light path converters 70 and 80 for converting the traveling path of the incident image, and first and second reflecting mirrors 91 and 95 for reflecting images formed thereon into left and right eyes EL and ER, respectively, of a user.

The light source 30 includes a lamp 31 made of metal halide or xenon which emits light, and a concave reflecting mirror 33 such as a parabolic mirror or an elliptic mirror, for reflecting the light emitted from the lamp 31 and guiding the light to travel in one direction and for allowing the reflected light to be collimated or focused. Also, the light source 30 may be a back light source having a lamp such as a fluorescent lamp and a mirror, as shown in FIG. 1, or a light emitting diode.

The image generator 40 for generating an image using light irradiated from the light source 30 is classified into a transmission type and a reflection type.

Figure 2:
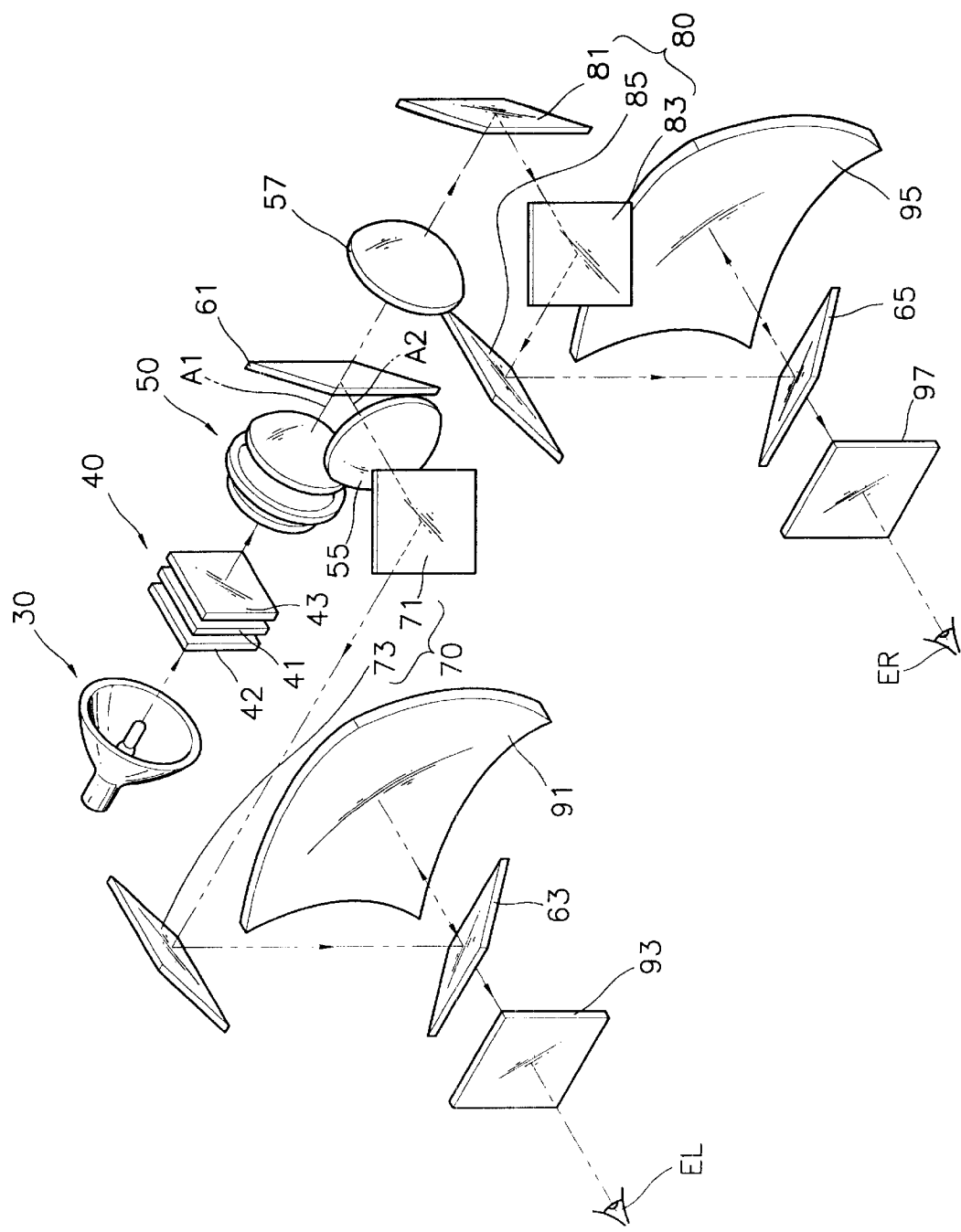
FIG. 2 is a schematic perspective view illustrating the optical arrangement of an HMD according to an embodiment of the present invention.
Figure 3:
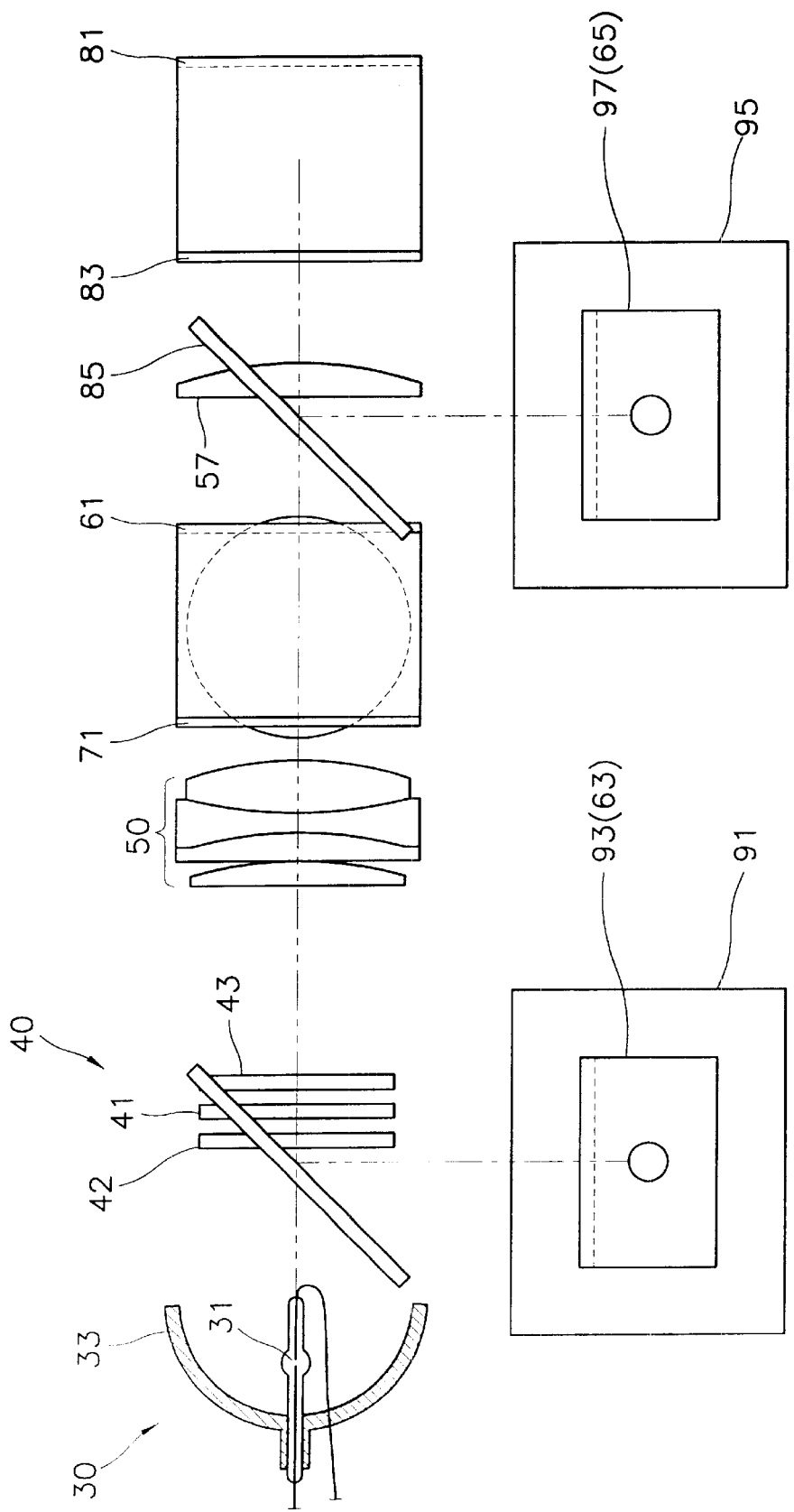
FIG. 3 is a front view of FIG. 2.
Figure 4:
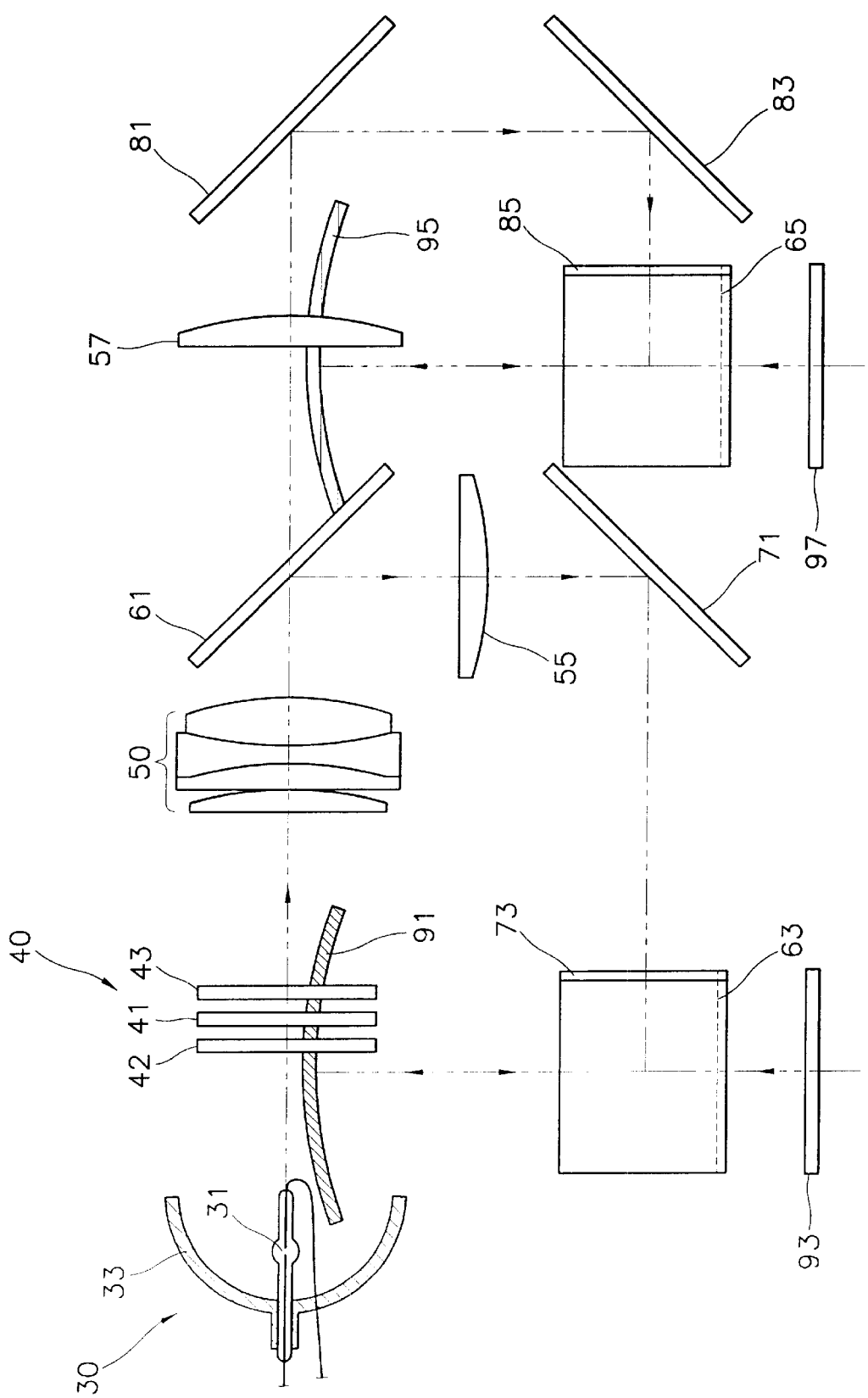
FIG. 4 is a plan view of FIG. 2.

A transmission type image generator, as shown in FIGS. 2 through 4, includes a transmission type LCD 41 having two-dimensional pixels independently driven, and a pair of polarizers 42 and 43 disposed in the front and rear of the LCD 41, respectively, for selectively transmitting incident light according to the direction of polarization.

Figure 5:
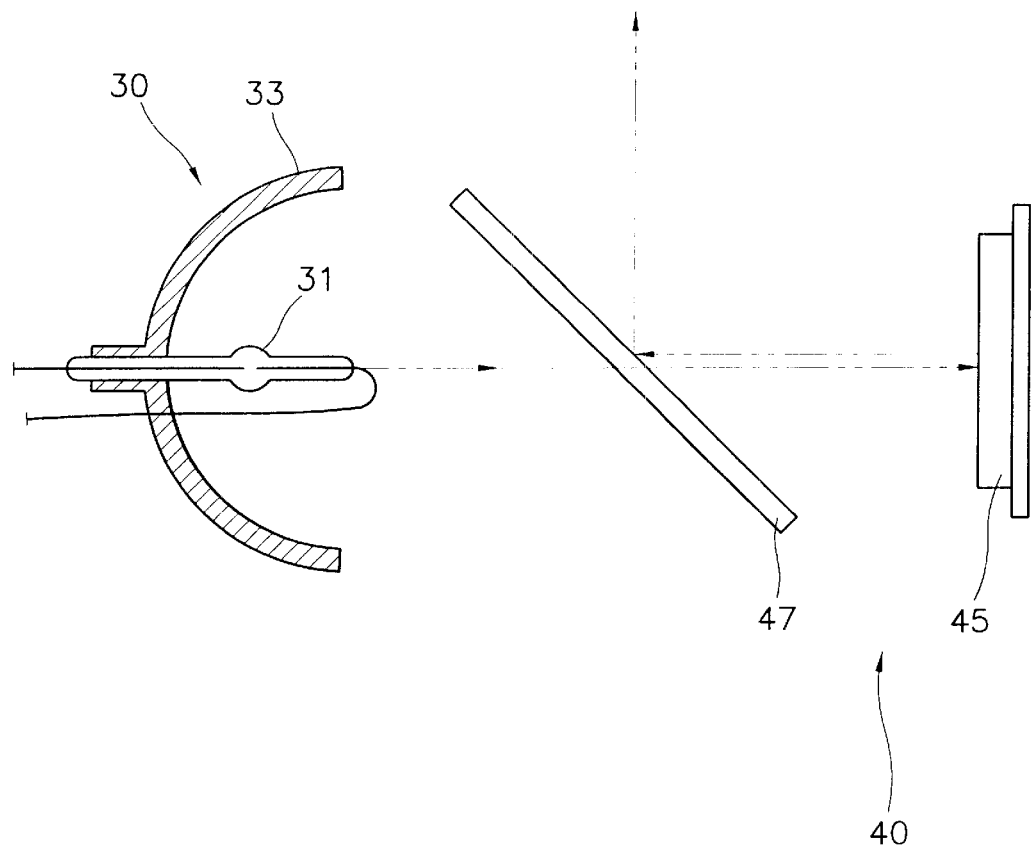
FIG. 5 is a schematic perspective view of an image generating means of the HMD according to the present invention.

A reflection type image generator, as shown in FIG. 5, includes a reflection type LCD 45 having two-dimensional pixels independently driven, and a polarized beam splitter 47, disposed on an light path between the light source 30 and the reflection type LCD 45, for selectively transmitting incident light according to the direction of polarization in order to convert the traveling path of the light. Here, a ferroelectric liquid crystal display device (FLCD) having an excellent response speed is preferably employed as the reflection type LCD 45. Thus, a linearly polarized beam component among the beams irradiated from the light source 30 passes through the polarized beam splitter 47 to be directed to the reflection type LCD 45. The reflection type LCD 45 is independently driven on a pixel-by-pixel basis. Thus, the polarization direction of the light reflected from a portion corresponding to an image is changed and the light whose polarization direction is changed is reflected at the polarized beam splitter 47 to then be directed toward the first light branching portion 61.

The image forming lens unit 50 is disposed on the light path between the image generator 40 and the first light branching portion 61, and primarily forms an image on the light path in front of the first and second reflecting mirrors 91 and 95.

The first light branching portion 61 transmits and reflects the image received from the image generator 40 to then branch off the image into two light paths. The first light branching portion 61 is a preferably a half mirror capable of transmitting and reflecting the incident image in a predetermined ratio of light amount.

The first light path converter 70 is disposed on the light path between the first light branching portion 61 and the second light branching portion 63 and converts the traveling path of the incident image. To this end, the first light path converter 70 is constructed to have first and second mirrors 71 and 73 for reflecting the incident image. Here, for the convenience'sake of explanation of the optical arrangement of the first and second mirrors 71 and 73, the optical axis of the image generated by the image generator 40 is divided into first optical axis A1 and a second optical axis A2 according to the traveling direction. The first optical axis A1 refers to an optical axis of an image traveling from the image generator 40 to the first light branching portion 61, and the second optical axis A2 refers to an optical axis of an image horizontally reflected from the first light branching portion 61. Also, a plane formed by the first optical axis A1 and the second optical axis A2 is defined as a first plane. The first mirror 71 reflects the incident image to allow the image reflected from the first light branching portion 61 to travel in a direction opposite to the traveling direction of the first optical axis A1 along the first plane. The second mirror 73 reflects the image reflected from the first mirror 71 so as to be received in the second light branching portion 63 in a perpendicular direction with respect to the first plane.

The second light branching portion 63 is preferably constructed by a half mirror capable of transmitting and reflecting the incident image in a predetermined ratio of light amounts. Also, the second light branching portion 63 reflects the image reflected from the second mirror 73 toward the first reflecting mirror 91 and transmits the image reflected from the first reflecting mirror 91. The image reflected from the first reflecting mirror 91 and transmitted through the second light branching portion 63 passes through a first window 93 to enter an eye EL of a user. The first reflecting mirror 91 is preferably a concave reflecting mirror capable of enlarging and reflecting an incident image. Here, a plane where an image is formed by the image forming lens unit 50 and field lenses 55 and 57 (to be described later) is positioned on a focus of the first reflecting mirror 91.

The second light path converter 80 is disposed on the light path between the first light branching portion 61 and the third light branching portion 65 and converts the traveling path of the image having passed through the first light branching portion 61. To this end, the second light path converter 80 is constructed to have third, fourth and fifth mirrors 81, 83 and 85 for reflecting the incident image. The third mirror 81 reflects the image having passed through the first light branching portion 61 to allow the image to travel in a direction parallel to the second optical axis A2 along the first plane. The fourth mirror 83 reflects the image reflected from the third mirror 81 to allow the image to travel in a direction parallel to the traveling direction of the image reflected from the first mirror 71 along the first plane. The fifth mirror 85 reflects the image reflected from the fourth mirror 83 so as to be directed toward the third light branching portion 65 in a perpendicular direction with respect to the first plane.

The third light branching portion 65 is preferably constructed by a half mirror capable of transmitting and reflecting the incident image in a predetermined ratio of light amounts. Also, the third light branching portion 65 reflects the image reflected from the fifth mirror 85 toward second reflecting mirror 95 and transmits the image reflected from the second reflecting mirror 95. The image reflected from the second reflecting mirror 95 and transmitted through the third light branching portion 65 passes through a second window 97 to enter another eye ER of a user. The second reflecting mirror 95 is preferably a concave reflecting mirror capable of enlarging and reflecting an incident image.

Here, in order to make angular magnifications of images enlarged by the first and second reflecting mirrors 91 and 95 and received in both eyes EL and ER of a user, respectively, equal to each other, the light path between the first light branching portion 61 and the second light branching portion 63 is preferably the same as the light path between the first light branching portion 61 and the third light branching portion 65.

Here, in order to increase the angular magnification calculated by Formula (1) and make room for installing the first light branching portion 61, field lenses 55 and 57 are preferably provided on the light paths between the first light branching portion 61 and the first mirror 71 and between the first light branching portion 61 and the third mirror 81, so that the plane where an image is formed by the image forming lens unit 50 is positioned to be close to the first and second reflecting mirrors 91 and 95.

The first and second light path converters 70 and 80 include the first through fifth mirrors 71, 73, 81, 83 and 85, thereby preventing images corresponding to the user's left and right eyes EL and ER from being reversed.

Figure 6:
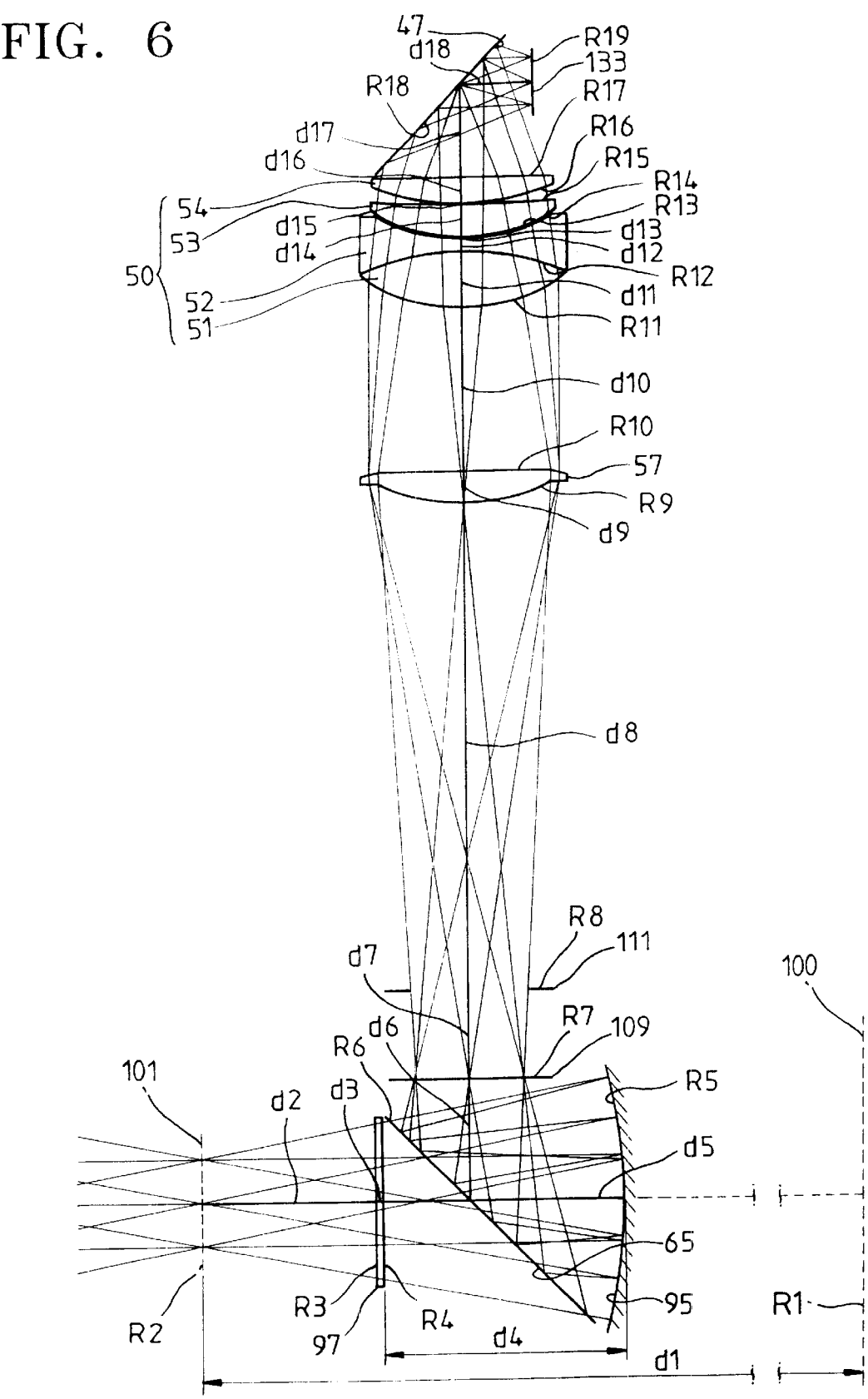
FIG. 6 illustrates the optical arrangement of an optical system for an HMD according to the present invention.

The HMD having the aforementioned configuration has an optical system for enlarging an image generated from the image generator 40 that includes first and second reflecting mirrors 91 and 95, semi-transmissive mirrors 63 and 65, an image forming lens unit 50 and field lenses 55 and 57, which will be described in more detail with reference to FIG. 6.

The image forming lens unit 50 primarily focuses an image irradiated from a display device (not shown) positioned on an image plane 133, and the field lens 57 forms the image focused by the image forming lens unit 50 on a primary image forming plane 109. The semi-transmissive mirror 65 transmits or reflects incident light to change the traveling path of the incident light. The second reflecting mirror 95 reflects the image branched at and received from the semi-transmissive mirror 65 toward the user's eye to then form the reflected image on a second image forming plane 101 (exit pupil), which coincides with the position of the user's eye.

In consideration of the user's left and right eyes EL and ER, the field lens 57, the semi-transmissive mirror 65 (corresponding to the second light branching portion of FIG. 2) and the second reflection mirror 95 must be actually provided in pairs. Here, the light path length of the light, which is branched by the first light branching portion 61 of FIG. 2, passes through the first field lens 55, the first semi-transmissive mirror 63 and the first reflecting mirror 91, and lands on the user's left eye EL, is the same length as that of the light which is branched by the first light branching portion 61, passes through the second field lens 57, the second semi-transmissive mirror 65 (corresponding to the third light branching portion of FIG. 2) and the second reflecting mirror 95, and lands on the user's right eye ER. Also, the optical arrangements of optical elements disposed on the two light paths are equal to each other. Therefore, to avoid redundant description of the light paths and optical arrangements for both the right eye ER and left eye EL, an example of a light path in which an image can be viewed by the right eye ER is shown in FIG. 6.

The optical system for an HMD having the aforementioned configuration is a type of magnifying lens with which a small-sized image provided from the image generator 40 is enlarged to be viewed, and is designed such that the eye side serves as an exit pupil and the display side serves as an image plane 133. In view of the design of the aforementioned optical system, the configuration and arrangement of the optical system for an HMD according to the present invention will be described.

An object image plane 100 is a plane on which a virtual image viewed as if it were positioned on the rear surface of the reflecting mirror 95 is formed when the reflecting mirror 95 is viewed through a user's eye positioned at the exit pupil. The size of the virtual image formed on the object image plane 100 is the image size perceived by the user.

The light originating from the exit pupil 101 passes through the window 97 and the semi-transmissive mirror 65 and travels toward the reflecting mirror 95. Here, the distance d2 between the exit pupil 101 and the window 97, that is, eye relief, must be long enough so that the HMD can be mounted even when the user wears glasses. To this end, the eye relief is preferably 20 mm or greater.

The reflecting mirror 95 is constructed by an aspherical concave reflecting mirror so that distortion aberration is less than or equal to 0.6%. In order to increase the length of a light path, the radius of curvature thereof is 65 mm or greater. The light reflected from the semi-transmissive mirror 65 lands on a first image forming plane 109 close to the semi-transmissive mirror 65. As described above, the image is formed on the first image forming plane 109 so as to be close to the semi-transmissive mirror 65 and the image plane 133 is positioned at a different location from the first image forming plane 109 using the field lens 57 and the image forming lens unit 50, thereby attaining the same optical performance in which the image generator 40 disposed on the image plane 133 is positioned on the first image forming plane 109, and realizing high magnification.

The light having passed through the first image forming plane 109 to then be diverged, passes through the field lens 57 and the image forming lens unit 50 to then be reflected from the polarized beam splitter 47 constituting the reflection type image generator, and then form an image on the image plane 133.

Here, the field lens 57 and the image forming lens unit 50 must be designed to make room for installing the first light branching portion (61 of FIG. 2) and a plurality of mirrors for converting light paths. Also, the light on the first image forming plane 109 must form an image again on the image plane 133.

To this end, the field lens 57 has positive power, and both its surfaces are aspherical so as to correct spherical aberration.

The image forming lens unit 50 is provided to focus incident light and includes a bi-convex lens 51 capable of correcting color aberration, a bi-concave lens 52, an aspherical lens 53 capable of correcting aberration and a planar-convex lens 54.

The bi-convex lens 51 is a crown-like lens having a low refractive index and a low dispersion, for example, having a refractive index N11 of 1.620 and Abbe's number v11 of 60.3, and has positive power. The bi-concave lens 52 is a flint-like lens having a high refractive index and a high dispersion, for example, having a refractive index N12 of 1.805 and Abbe's number v12 of 25.4, and has negative power. Thus, the incident light having passed through the bi-convex lens 51 and the bi-concave lens 52 is focused by the bi-convex lens 51 and the color aberration thereof is corrected the by the strong divergent power of the bi-concave lens 52. The aspherical lens 53 is aspherical in both planes so as to correct aberration such as spherical aberration included in the incident light. The aspherical coefficients of the reflecting mirror 95, the field lens 57 and the aspherical lens 53 of the image forming lens unit 50 are determined so as to form an image properly on the primary image forming plane 109 and the image plane 133 even if the spot diameter of light originating from the exit pupil 101 is substantially 11 mm.

Here, a stop 111 for shielding extra light is preferably installed on the light path between the primary image forming plane 109 and the field lens 57.

The optical system having the above-described configuration is a retro-focus lens. The retro-focus lens is a lens in which the effective focal length made by the image forming lens unit 50, the field lens 57 and the reflecting mirror 95 is smaller than the back focal length thereof. For example, if the lens is designed to have data as listed in Tables 1 and 2, the lens becomes a retro-focus lens wherein the effective focal length is about 15.2 mm and the back focal length is about 21 mm. In the case of employing a reflection type display device by designing the back focal length in the above-described manner, it is possible to obtain the space for installing the polarized beam splitter (or semi-transmissive mirror) 47.

Tables 1 and 2 list design and optical arrangement data of the optical system for an HMD according to the present invention.

The aspheric curvatures of the above-stated aspherical lenses are determined by formula (2) and aspherical coefficients listed in Table 2.

$$Z = \frac{ch^2}{1 + [1 - (1+k)c^2h^2]^{1/2}} + Ah^4 + Bh^6 + Ch^8 + Dh^{10} \ldots \quad (2)$$

where Z is the sag from a lens apex at a position spaced apart from the optical axis of each lens unit by a height h, c is the curvature of the lens at the optical axis which is an inverse number of the radius of curvature, k is a conic constant, and A, B, C and D are aspherical coefficients of the respective lenses, respectively. Although the conic constant k is substantially different according to the lenses, it is set to 0 in Tables 1 and 2, for accurate design of a lens.

TABLE 1

|  |  | Curvature radius (mm) | Lens thickness or distance (mm) | Refractive index | Abbe's number |
|---|---|---|---|---|---|
| Object image plane |  | $R_1 = \infty$ | $d_1 = 2000.0$ |  |  |
| Exit pupil (Secondary image forming plane) |  | $R_2 = \infty$ | $d_2 = 21.0$ |  |  |
| Window |  | $R_3 = \infty$ | $d_3 = 1.0$ | $n_3 = 1.516$ | $v_3 = 64.1$ |
|  |  | $R_4 = \infty$ | $d_4 = 30.0$ |  |  |
| Reflecting mirror |  | $R_5 = -68.10$ (Aspherical surface 1) | $d_5 = -19.0$ |  |  |
| Semi-transmissive mirror |  | $R_6 = \infty$ | $d_6 = 15.0$ |  |  |
| Primary image forming plane |  | $R_7 = \infty$ | $d_7 = 10.0$ |  |  |
| Stop |  | $R_8 = \infty$ | $d_8 = 62.0$ |  |  |
| Field lens |  | $R_9 = 27.87$ (Aspherical surface 2) | $d_9 = 4.0$ | $n_9 = 1.492$ | $v_9 = 57.1$ |
|  |  | $R_{10} = -353.14$ (Aspherical surface 3) | $d_{10} = 20.0$ |  |  |
| Image forming lens unit | Bi-convex lens | $R_{11} = 22.51$ | $d_{11} = 7.2$ | $n_{11} = 1.620$ | $v_{11} = 60.3$ |
|  | Bi-concave Lens | $R_{12} = -30.90$ | $d_{12} = 1.5$ | $n_{12} = 1.805$ | $v_{12} = 25.4$ |
|  |  | $R_{13} = 21.45$ | $d_{13} = 0.3$ |  |  |
|  | Aspherical lens | $R_{14} = 21.08$ (Aspherical surface 4) | $d_{14} = 4.0$ | $n_{14} = 1.492$ | $v_{14} = 57.1$ |
|  |  | $R_{15} = 1801.93$ (Aspherical surface 5) | $d_{15} = 0.1$ |  |  |
|  | Planar-convex lens | $R_{16} = 30.53$ | $d_{16} = 3.1$ | $n_{16} = 1.805$ | $v_{16} = 25.4$ |
|  |  | $R_{17} = \infty$ | $d_{17} = 11.5$ |  |  |
| Polarized beam splitter |  | $R_{18} = \infty$ | $d_{18} = -9.0$ |  |  |
| Image plane |  | $R_{19} = \infty$ | $d_{19} = 0$ |  |  |

TABLE 2

| | Aspherical coefficient | | | |
|---|---|---|---|---|
| | A | B | C | D |
| Aspherical surface 1 | $0.514838 \times 10^{-6}$ | $-0.102077 \times 10^{-8}$ | $0.288661 \times 10^{-11}$ | $-0.251014 \times 10^{-14}$ |
| Aspherical surface 2 | $0.154914 \times 10^{-6}$ | $-0.100080 \times 10^{-6}$ | $0.158783 \times 10^{-8}$ | $-0.923718 \times 10^{-11}$ |
| Aspherical surface 3 | $0.802451 \times 10^{-5}$ | $-0.937513 \times 10^{-7}$ | $0.141815 \times 10^{-8}$ | $-0.871581 \times 10^{-11}$ |
| Aspherical surface 4 | $0.803628 \times 10^{-5}$ | $-0.638752 \times 10^{-7}$ | $-0.171436 \times 10^{-9}$ | $-0.624831 \times 10^{-11}$ |
| Aspherical surface 5 | $0.225326 \times 10^{-4}$ | $-0.245371 \times 10^{-7}$ | $-0.649459 \times 10^{-9}$ | $-0.491943 \times 10^{-11}$ |

The aforementioned optical system for an HMD according to the present invention has the following effects.

First, distortion aberration is less than or equal to about 0.6% by forming aspherical reflecting mirrors, thereby reducing distortion of a screen. Second, the aberration performance can be achieved with respect to the overall area of a light spot having a diameter of about 11 mm, thereby maintaining screen contrast characteristics at both a bright spot where the diameter of a user's pupil is about 2 mm and a dark spot where the diameter of a user's pupil is about 8 mm, and preventing screen deterioration due to delicate movement of the user's pupil. Third, eye relief of 20 mm or greater can be attained, thereby allowing viewing in a state where the user wears glasses. Fourth, the overall optical system is formed by a retro-focus lens to secure a sufficiently long back focal length, thereby easily employing a reflection type display device such as an FLCD.

Figure 7:
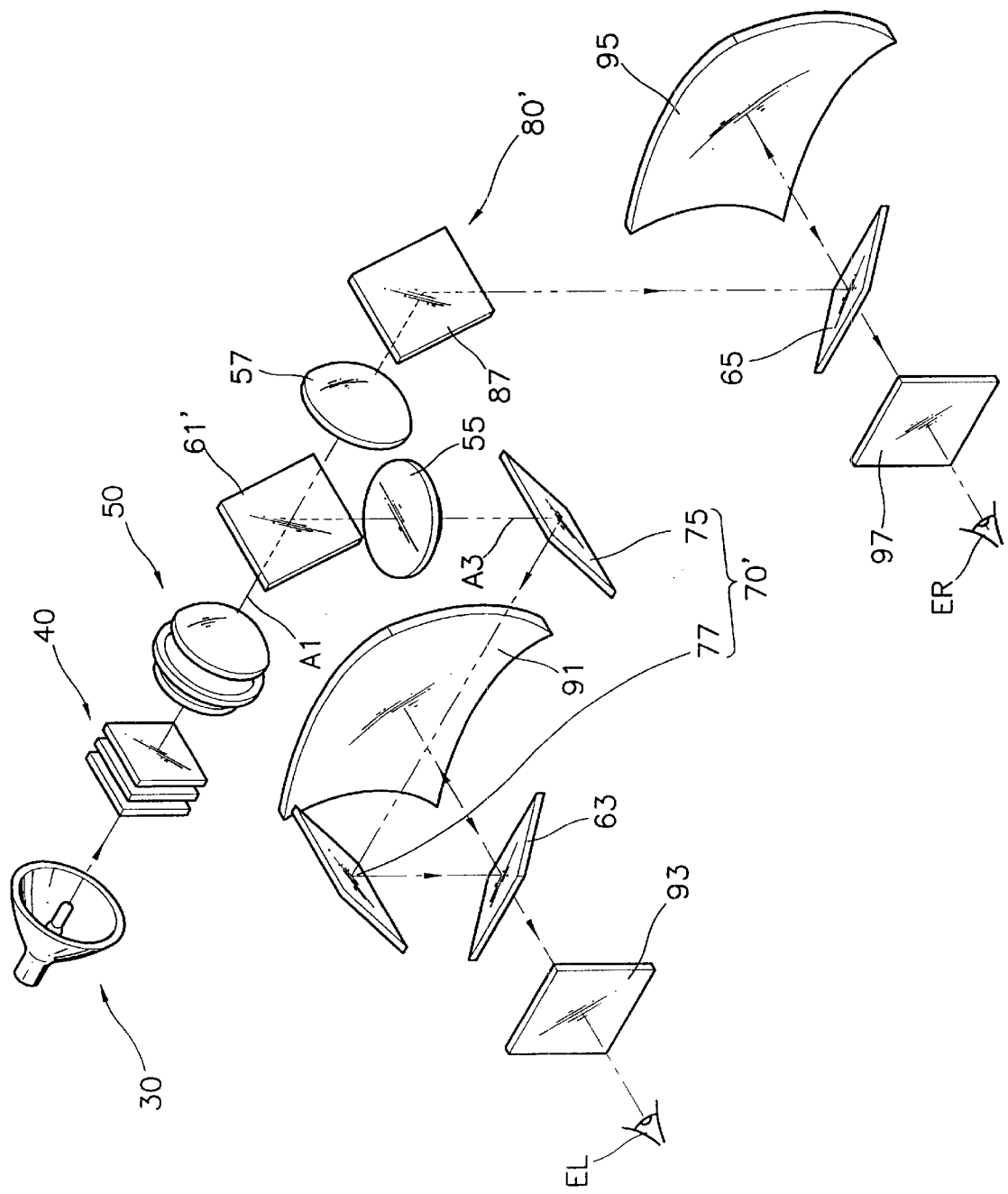
FIG. 7 is a schematic perspective view illustrating the optical arrangement of an HMD according to another embodiment of the present invention.

Referring to FIG. 7, an HMD according to another embodiment of the present invention includes a light source 30, an image generator 40 for generating an image from light irradiated form the light source 30, an image forming lens unit 50 for primarily forming the image generated by the image generator 40, first through third light branching portion 61', 63 and 65 for transmitting and reflecting an incident image and branching the incident image, first and second light path converters 70' and 80' for converting the traveling path of the incident image, and first and second reflecting mirrors 91 and 95 for reflecting images formed thereon toward both of the user's eyes EL and ER, respectively. The images are derived from the image which is formed by the image generator 40 and whose traveling path is changed and branched in two directions by the first and second light path converters 70' and 80' and the second and third light branching portions 63 and 65. Here, the same reference numerals as those shown in FIG. 2 denote the same elements for performing the same or similar functions, and a detailed explanation thereof will be omitted.

One of the features of this embodiment is that the structures of the first and second light path converters 70' and 80' are changed and the arrangement of the first light branching portion 61' is changed to thus reduce the number of optical elements.

The first light branching portion 61' transmits and reflects the image received from the image generator 40 and branches the image so that it travels along two light paths. In other words, the first light branching portion 61' is disposed such that the light reflected from the first light branching portion 61' travels directly downward with respect to the first plane.

The first light path converter 70' is disposed on the light path between the first light branching portion 61' and the second light branching portion 63 and converts the traveling path of the incident image. To this end, the first light path converter 70' is constructed to have first and second mirrors 75 and 77 for reflecting the incident image. Here, for sake of convenience of explanation of the optical arrangement of the first and second mirrors 75 and 77, the optical axis of the image generated by the image generator 40 is divided into first optical axis A1 and a third optical axis A3 according to the traveling direction. The first optical axis A1 refers to an optical axis of an image traveling from the image generator 40 to the first light branching portion 61', and the third optical axis A3 refers to an optical axis of an image horizontally reflected from the first light branching portion 61'. Also, a plane formed by the first optical axis A1 and the third optical axis A3 is defined as a second plane. The first mirror 75 reflects the incident image to allow the image reflected from the first light branching portion 61' to travel in a direction opposite to the traveling direction of the first optical axis A1 along the second plane. The second mirror 77 reflects the image reflected from the first mirror 75 so as to be received in the second light branching portion 63 in a direction parallel to the third optical axis A3, that is, in a direction parallel to the second plane.

The second light path converter 80' is disposed on the light path between the first light branching portion 61' and the third light branching portion 65 and converts the traveling path of the image having passed through the first light branching portion 61'. To this end, the second light path converter 80' is constructed to have a third mirror 87 for reflecting the incident image. The third mirror 87 reflects the image having passed through the first light branching portion 61' to allow the image to travel in a direction parallel to the third optical axis A3 along the second plane so as to be directed toward the third light branching portion 65.

Here, in order to make angular magnifications of images enlarged by the first and second reflecting mirrors 91 and 95 and received in both eyes EL and ER of a user, respectively, equal to each other, the light path between the first light branching portion 61' and the second light branching portion 63 is preferably the same as that between the first light branching portion 61' and the third light branching portion 65.

The aforementioned HMD according to the present invention can provide images corresponding to left and right eyes of a user using a single display unit. Also, an image is primarily formed on a light path using an image forming lens unit and a field lens, thereby easily attaining a space for optical arrangement of various optical elements and image generator. Further, since the image forming positions can be arranged so as to be close to first and second reflecting mirrors, a large screen having angular magnification of over 10 times can be attained even in the case of employing a small-sized display device of about 0.4 inch as the image generator. Also, two sets of mirrors are provided as a first light path converter and a single mirror is provided as a second light path converter, thereby preventing images reflected from the first and second reflecting mirrors from being reversed, and greatly reducing the number of necessary optical elements.

What is claimed is:

1. A head mounted display device comprising:
    a light source for generating and irradiating light;
    image generating means for generating an image from the light irradiated from the light source;
    an image forming lens unit for primarily forming the image generated by the image generating means;
    first light branching means for transmitting and reflecting the image generated by the image generating means, wherein the first light branching means branches the light into two light paths;
    first light path converting means for converting a traveling path of the image reflected from the first light branching means;
    a first reflecting mirror on which the image received from the first light path converting means is reflected toward an eye of a user;
    second light branching means, disposed on the light path between the first light path converting means and the first reflecting mirror, for changing a traveling path of the image incident upon the second light branching means;
    second light path converting means for converting the traveling path of the image transmitted through the first light branching means;
    a second reflecting mirror on which the image received from the second light path converting means is reflected toward the other eye of a user; and
    third light branching means, disposed along the light path between the second light path converting means and the second reflecting mirror, for changing the traveling path of the image incident upon the third light branching means.

2. The head mounted display device according to claim 1, wherein the image generating means comprises:
    a transmission type liquid crystal display having pixels which are independently driven; and
    a pair of polarizers disposed in the front and rear of the liquid crystal display, for selectively transmitting incident light according to a direction of polarization.

3. The head mounted display device according to claim 1, wherein the image generating means comprises:
    a reflection type liquid crystal display having pixels which are independently driven; and
    a polarized beam splitter, disposed on a light path between the light source and the reflection type liquid crystal display, for selectively transmitting incident light according to a direction of polarization in order to convert the traveling path of the light.

4. The head mounted display device according to claim 1, wherein each of the first, second and third light branching means is a half mirror capable of transmitting and reflecting an incident image in a predetermined ratio of light amounts.

5. The head mounted display device according to claim 1, wherein each of the first and second reflecting mirrors is a concave reflecting mirror capable of enlarging and reflecting an incident image.

6. The head mounted display device according to claim 1, wherein a length of a light path between the first light branching means and the second light branching means is the same as a length of a light path between the first light branching means and the third light branching means.

7. The head mounted display device according to claim 1, further comprising:
    a first field lens provided on a light path between the first light branching means and the first light path converting means; and
    a second field lens provided on a light path between the first light branching means and the second light path converting means.

8. The head mounted display device according to claim 1, wherein the first light path converting means comprises:
    a first mirror for reflecting an incident image to allow the image reflected from the first light branching means to travel in a direction opposite to a traveling direction of a first optical axis, wherein the first optical axis is an optical axis of the image traveling to the first light branching means along a first plane formed by the first optical axis and a second optical axis, wherein the second optical axis is an optical axis of an image horizontally reflected from the first light branching means; and
    a second mirror for reflecting the image reflected from the first mirror so that the image is received in the second light branching means in a perpendicular direction with respect to the first plane.

9. The head mounted display device according to claim 8, wherein the second light path converting means comprises:
    a third mirror for reflecting the image transmitted through the first light branching means to allow the image to travel in a direction parallel to the second optical axis along the first plane;
    a fourth mirror for reflecting the image reflected from the third mirror to allow the image to travel in a direction parallel to the traveling direction of the image reflected from the first mirror along the first plane; and
    a fifth mirror for reflecting the image reflected from the fourth mirror so that the image is directed toward the third light branching means in a perpendicular direction with respect to the first plane.

10. The head mounted display device according to claim 1, wherein the first light path converting means comprises:
    a first mirror for reflecting an incident image to allow the image reflected from the first light branching means to travel in a direction opposite to a traveling direction of a first optical axis, wherein the first optical axis is an optical axis of the image traveling to the first light branching means along a second plane formed by the first optical axis and a third optical axis, wherein the third optical axis is an optical axis of the image vertically reflected from the first light branching means; and
    a second mirror for reflecting the image reflected from the first mirror so that the image is received in the second light branching means in a parallel direction with respect to the second plane.

11. The head mounted display device according to claim 10, wherein the second light path converting means comprises a third mirror for reflecting the image transmitted through the first light branching means to allow the image to travel in a direction parallel to the second optical axis along the second plane, wherein the images formed on the first and second reflecting mirrors are disposed in the same direction.

12. An optical system for a head mounted display device for forming an image which is generated by a display device, by enlarging the image using light irradiated from a light source, the optical system comprising:

an image forming lens unit for focusing the image generated by the display device, wherein the image forming lens unit comprises:
at least one lens made of a material having a high refractive index and a high dispersion in order to have a strongly negative power; and
at least one lens made of a material having a low refractive index and a low dispersion in order to have a strongly positive power;

a field lens, having a positive power, for forming a focused image on a primary image forming plane;

a semi-transmissive mirror for transmitting or reflecting incident light to change a traveling path of the incident light; and a reflecting mirror, on which the incident light branched from the semi-transmissive mirror lands, for reflecting the light toward an eye of a user to allow the light to be directed toward a pupil of the user.

13. The optical system according to claim 12, wherein an effective focal length made by the image forming lens unit, the field lens and the reflecting mirror is smaller than a back focal length made by the image forming lens unit, the field lens and the reflecting mirror.

14. The optical system according to claim 12, wherein the reflecting mirror is a concave reflecting mirror which is capable of enlarging and reflecting an incident image and whose reflecting surface is an aspherical surface.

15. A head mounted display device comprising:

a light source operative to generate and irradiate light;

an image generator operative to generate an image from the light irradiated from the light source;

an image forming lens unit operative to primarily form the image generated by the image generator;

a first light divider operative to transmit and reflect the image generated by the image generator, wherein the first light divider branches the light into two light paths;

a first light path director operative to convert a traveling path of the image reflected from the first light divider;

a first reflecting mirror on which the image received from the first light path director is reflected toward an eye of a user;

a second light divider, disposed on the light path between the first light path director and the first reflecting mirror, operative to change a traveling path of the image incident upon the second light divider;

a second light path director operative to convert the traveling path of the image transmitted through the first light divider;

a second reflecting mirror on which the image received from the second light path director is reflected toward the other eye of a user; and a third light divider, disposed along the light path between the second light path director and the second reflecting mirror, operative to change the traveling path of the image incident upon the third light divider.

16. The head mounted display device according to claim 15, wherein each of the first, second and third light dividers is a half mirror capable of transmitting and reflecting an incident image in a predetermined ratio of light amounts.

17. The head mounted display device according to claim 15, wherein a length of a light path between the first light divider and the second light divider is the same as a length of a light path between the first light divider and the third light divider.

18. The head mounted display device according to claim 15, further comprising:

a first field lens provided on a light path between the first light divider and the first light path director; and a second field lens provided on a light path between the first light divider and the second light path director.

19. The head mounted display device according to claim 15, wherein the first light path director comprises:

a first mirror for reflecting an incident image to allow the image reflected from the first light divider to travel in a direction opposite to a traveling direction of a first optical axis, wherein the first optical axis is an optical axis of the image traveling to the first light divider along a first plane formed by the first optical axis and a second optical axis, wherein the second optical axis is an optical axis of an image horizontally reflected from the first light divider; and a second mirror for reflecting the image reflected from the first mirror so that the image is received in the second light divider in a perpendicular direction with respect to the first plane.

20. The head mounted display device according to claim 19, wherein the second light path director comprises:

a third mirror for reflecting the image transmitted through the first light divider to allow the image to travel in a direction parallel to the second optical axis along the first plane;

a fourth mirror for reflecting the image reflected from the third mirror to allow the image to travel in a direction parallel to the traveling direction of the image reflected from the first mirror along the first plane; and a fifth mirror for reflecting the image reflected from the fourth mirror so that the image is directed toward the third light divider in a perpendicular direction with respect to the first plane.

21. The head mounted display device according to claim 15, wherein the first light path director comprises:

a first mirror for reflecting an incident image to allow the image reflected from the first light divider to travel in a direction opposite to a traveling direction of a first optical axis, wherein the first optical axis is an optical axis of the image traveling to the first light divider along a second plane formed by the first optical axis and a third optical axis, wherein the third optical axis is an optical axis of the image vertically reflected from the first light divider; and a second mirror for reflecting the image reflected from the first mirror so that the image is received in the second light divider in a parallel direction with respect to the second plane.

22. The head mounted display device according to claim 21, wherein the second light path director comprises a third mirror for reflecting the image transmitted through the first light divider to allow the image to travel in a direction parallel to the second optical axis along the second plane, wherein the images formed on the first and second reflecting mirrors are disposed in the same direction.

* * * * *